US010113489B2

(12) United States Patent
Molavi et al.

(10) Patent No.: US 10,113,489 B2
(45) Date of Patent: Oct. 30, 2018

(54) AIR SHUTOFF SWING GATE VALVE

(71) Applicant: Amot Controls Corp., Houston, TX (US)

(72) Inventors: Kamyar Molavi, The Woodlands, TX (US); Ken McClymonds, The Woodlands, TX (US)

(73) Assignee: AMOT Controls Corp., Houston, TX (US)

(*) Notice: Subject to any disclaimer, the term of this patent is extended or adjusted under 35 U.S.C. 154(b) by 117 days.

(21) Appl. No.: 15/042,954

(22) Filed: Feb. 12, 2016

(65) Prior Publication Data
US 2016/0177843 A1 Jun. 23, 2016

Related U.S. Application Data

(63) Continuation of application No. 13/236,020, filed on Sep. 19, 2011, now abandoned.

(51) Int. Cl.
F16K 31/56 (2006.01)
F16K 3/06 (2006.01)
(Continued)

(52) U.S. Cl.
CPC .............. *F02D 9/14* (2013.01); *F02D 11/04* (2013.01); *F02D 17/04* (2013.01);
(Continued)

(58) Field of Classification Search
CPC ........ F16K 3/06; F16K 31/003; F16K 31/563; F02D 9/14; F02D 11/04; F02D 17/04; F02M 35/10255; Y10T 137/8225
(Continued)

(56) References Cited

U.S. PATENT DOCUMENTS 641,117 A * 1/1900 Kaye ...................... G05D 13/00
137/47
1,897,000 A 2/1933 Biery
(Continued)

FOREIGN PATENT DOCUMENTS

| EP | 0106484 | 4/1984 |
| GB | 1429650 | 3/1976 |
| GB | 2256008 | 11/1992 |

OTHER PUBLICATIONS

European Search Report for related European Patent Application No. 12832802.8-1606 dated Mar. 3, 2015.
(Continued)

*Primary Examiner* — Michael R Reid
*Assistant Examiner* — Jonathan Waddy
(74) *Attorney, Agent, or Firm* — Snyder, Clark, Lesch, & Chung, LLP

(57) ABSTRACT

An air shutoff valve includes a passage for supplying air, a swing gate, a shaft attached to a reset handle, and a spring to urge the gate toward its closed position. A trigger assembly secures the shaft and gate in the open position and includes an actuator, a cam, and a rocker arm. A cam surface of the arm has a notch to receive a sear point of the cam. Movement of the handle against the spring causes the cam contact surface of the cam to follow the cam surface to cause the arm to rotate such that the sear point is received in the notch. Actuating the actuator causes the arm to pivot away from the cam such that the sear point is released from the notch, wherein the spring causes the shaft to move the gate to its closed position.

35 Claims, 13 Drawing Sheets

(51) Int. Cl.
  *F02D 9/14* (2006.01)
  *F02M 35/10* (2006.01)
  *F02D 11/04* (2006.01)
  *F02D 17/04* (2006.01)
  *F16K 31/00* (2006.01)

(52) U.S. Cl.
  CPC ......... *F02M 35/10255* (2013.01); *F16K 3/06* (2013.01); *F16K 31/003* (2013.01); *F16K 31/563* (2013.01); *Y10T 137/8225* (2015.04)

(58) Field of Classification Search
  USPC ......... 251/66, 68, 74, 90, 91, 101, 107, 108, 251/109, 111, 114, 301, 302, 303
  See application file for complete search history.

(56) References Cited

U.S. PATENT DOCUMENTS

| | | |
|---|---|---|
| 2,382,720 A | 8/1945 | Hopkins |
| 2,716,999 A | 9/1955 | Badger et al. |
| 3,056,393 A | 10/1962 | Friddell |
| 3,115,951 A | 12/1963 | Fox |
| 4,537,386 A | 8/1985 | Krepela et al. |
| 4,546,954 A | 10/1985 | Bodnar |
| 6,206,337 B1 | 3/2001 | Veillet, Jr. |
| 7,442,982 B2 | 10/2008 | Won et al. |

OTHER PUBLICATIONS

International Search Reported for corresponding PCT Application No. PCT/US2012/055859 dated Dec. 24, 2012.
International Search Report for related PCT Application No. PCT/US2012/060354 dated Jan. 11, 2013.

\* cited by examiner

AIR SHUTOFF SWING GATE VALVE

CROSS-REFERENCE TO RELATED APPLICATIONS

This continuation application claims the benefit under 35 U.S.C. § 120 of application Ser. No. 13/236,020 filed on Sep. 19, 2011 entitled AIR SHUTOFF SWING GATE VALVE and whose entire disclosure is incorporated by reference herein.

BACKGROUND OF THE INVENTION

The present invention relates to an air shutoff valve, for example, to prevent uncontrolled runaway of the engine.

Diesel engines, in the presence of combustible gases in the atmosphere, occasionally enter a runaway condition in which the engine, without a proper device to mitigate this problem, can enter an uncontrolled acceleration. In this condition, the engine experiences overspeed and, if not stopped, the engine can reach speeds that can result in destruction and/or catastrophic engine failure, and personal injury. There are a number of causes of runaway including, for example, a faulty engine governor, engine overheating or the ingestion of unregulated hydrocarbons into the combustion chamber through the intake air. Such hydrocarbons may be from an external source such as airborne gas, or from the engine itself due to a malfunction such as failure of turbocharger oil seals.

A conventional way to stop a diesel engine is to stop the flow of fuel to the combustion chamber. However, an alternate method must be employed to stop a diesel engine in the event of runaway. The most common method, used for many years, involves blocking the air supply to the combustion chamber of the engine. Once deprived of oxygen, the runaway ceases. Accordingly, safety valves which cut off the air supply to the engine have been developed to shut off the engine in such a situation.

One type of shut-off valve placed in the air intake to the engine employs a swing gate valve that is spring biased to be in a closed position that blocks air supply to the combustion chamber. The spring loaded valve is held in an open position by a trip mechanism that is manually cocked to hold the valve in the open position. A solenoid or by other appropriate device may be used to trip the trip mechanism to close the valve. When in the open position, there is an unobstructed air supply to the engine. Upon runaway, the device is engaged (or disengaged), and the valve snaps into its closed position, thus cutting off the air supply to the combustion chamber, thereby starving the engine of oxygen such that the engine stalls.

Shutoff valves used in the past were susceptible to damage from high vibration loads and excessively high temperatures. The present invention provides improvements to past designs and provides a valve capable of experiencing higher vibration and temperature.

All references cited herein are incorporated herein by reference in their entireties.

BRIEF SUMMARY OF THE INVENTION

An air shutoff swing gate valve for an engine is provided that includes a valve body having an air passage where the air passage is for supplying air to an engine. The valve includes a valve swing gate that is pivotable on a swing arm that is pivotally disposed adjacent to the valve body. The swing gate is pivotable adjacent to the air passage from an open position, wherein the swing gate is positioned adjacent to the air passage to provide for free flow of air through the air passage, to a closed position, wherein the swing gate is positioned within the air passage to substantially close off the air passage. The valve further includes an actuation assembly having an actuation housing and a trigger assembly. The actuation housing may be integral to the valve body. The actuation housing is disposed on the valve body. A pivotable shaft is provided having a longitudinal axis. The shaft extends from the actuation assembly to the swing arm. The swing arm is disposed on the shaft such that rotation of the shaft about its longitudinal axis causes rotation of the swing arm to move the swing gate between its open and closed positions. A reset handle is disposed on the shaft. Rotation of the reset handle rotates the shaft and causes the swing gate to move from its closed position to its open position. A spring, such as a torsion spring, rotationally biases the shaft about its longitudinal axis to urge the swing gate toward its closed position.

The trigger assembly is for securing the shaft such that the swing gate is held in its open position and is also for triggering the shaft to rotate due to biasing from the spring. The trigger assembly and biasing spring cause the swing gate to move from the open position to the closed position. The trigger assembly includes an actuator disposed at a first end of the actuation housing. The actuator has an actuator shaft. A pivotable cam is disposed in the actuation housing and disposed on the pivotable shaft such that rotation of the pivotable cam causes rotation of the pivotable shaft. The cam has a sear point and a cam contact surface. A trigger rocker arm is disposed in the actuation housing where the trigger rocker arm has a first end pivotally attached to actuator shaft of the actuator, a second end pivotally attached to a second end of the actuation housing, and a curved cam surface adjacent to the second end of the trigger rocker arm. The curved cam surface has a notch to receive the sear point of the cam. The cam surface is for contacting the cam contact surface such that rotational movement of the reset handle against the bias of the spring causes the cam contact surface of the pivotable cam to follow the curved cam surface of the trigger rocker arm to cause the rocker arm to rotate about its second end to a position when the sear point is received in the notch.

Actuation of the actuator to cause movement of the actuator shaft causes the first end of the rocker arm to move such that the rocker arm pivots about the second end of the rocker arm away from the cam such that the sear point of the cam is released from notch of the rocker arm. The spring then causes the pivotable shaft to rotate about its longitudinal axis to move the swing gate to its closed position.

The actuator may be, for example, mechanical, electromechanical, hydraulic, pneumatic, piezo, or a solenoid. A switch may be provided that is connected to a display that indicates when the swing gate is in its open and closed positions. The switch may be adjacent to the cam wherein rotation of the cam activates and deactivates the switch.

Optionally, a manual override device may be provided to provide for manual tripping of the swing gate. The manual override device may include an override device shaft slidably disposed in an aperture in the actuator housing adjacent to the actuator. The override device shaft is substantially parallel to an axis of movement of the actuator shaft. The override device shaft has a first end and a second end. The first end is disposed outside the actuator housing and has a handle for manual movement of the override device shaft through the aperture. The second end is disposed adjacent to the first end of the rocker arm, such that manual movement of the override device shaft causes substantially identical movement of the rocker arm as the movement caused by the actuator shaft. This manual override can also be applied to the second embodiment described below.

A second preferred embodiment of the air shutoff swing gate valve of the present invention is also provided. This embodiment is directed to a valve that includes a valve body, a valve swing gate, an actuation assembly, a pivotable shaft, a reset handle and a spring as described above with respect to the first embodiment. However, in this second embodiment, the trigger assembly is somewhat different. Here, an actuator is disposed at a first end of the actuation housing, the actuator having an actuator shaft. A pivotable cam is disposed in the actuation housing adjacent to a second end of the actuation housing and disposed on the pivotable shaft such that rotation of the pivotable cam causes rotation of the pivotable shaft. The cam has a notch and a cam surface. A trigger rocker arm is disposed in the actuation housing. The trigger rocker arm has a first end pivotally attached to actuator shaft of the actuator, a central portion pivotally attached to the actuation housing between the pivotable cam and the actuator, and a sear point and a cam contact surface at a second end of the trigger rocker arm. The sear point is for receipt in the notch of the cam. The cam surface of the cam is for contacting the cam contact surface of the trigger rocker arm. Rotational movement of the reset handle against the bias of the spring causes the cam contact surface of the trigger rocker arm to follow the cam surface of the cam to cause the rocker arm to rotate about its central portion to a position until the sear point is received in the notch. Actuation of the actuator to cause movement of the actuator shaft causes the first end of the rocker arm to move such that the rocker arm pivots about the central portion of the rocker arm to cause the second end of the trigger rocker arm to rotate away from the notch such that the sear point of the trigger rocker arm is released from notch of the cam. The spring causes the shaft to rotate about its longitudinal axis to move the swing gate to its closed position.

The actuator may be, for example, mechanical, electromechanical, hydraulic, pneumatic, piezo, or a solenoid. A switch may be provided that is connected to a display that indicates when the swing gate is in its open and closed positions. The switch may be adjacent to the cam wherein rotation of the cam activates and deactivates the switch.

In this second embodiment, a manual override device may be provided for manual tripping of the swing gate. The manual override device may include an override device shaft slidably disposed in an aperture in the actuator housing adjacent to the actuator. The override device shaft is coaxial with the actuator shaft and has a first end and a second end. The first end is disposed outside the actuator housing and has a handle for manual movement of the override device shaft through the aperture. The second end is disposed on the actuator shaft such that manual movement of the override device shaft causes substantially identical movement of the rocker arm as the movement caused by the actuator shaft. This manual override can also be applied to the first embodiment described above.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

Figure 1:
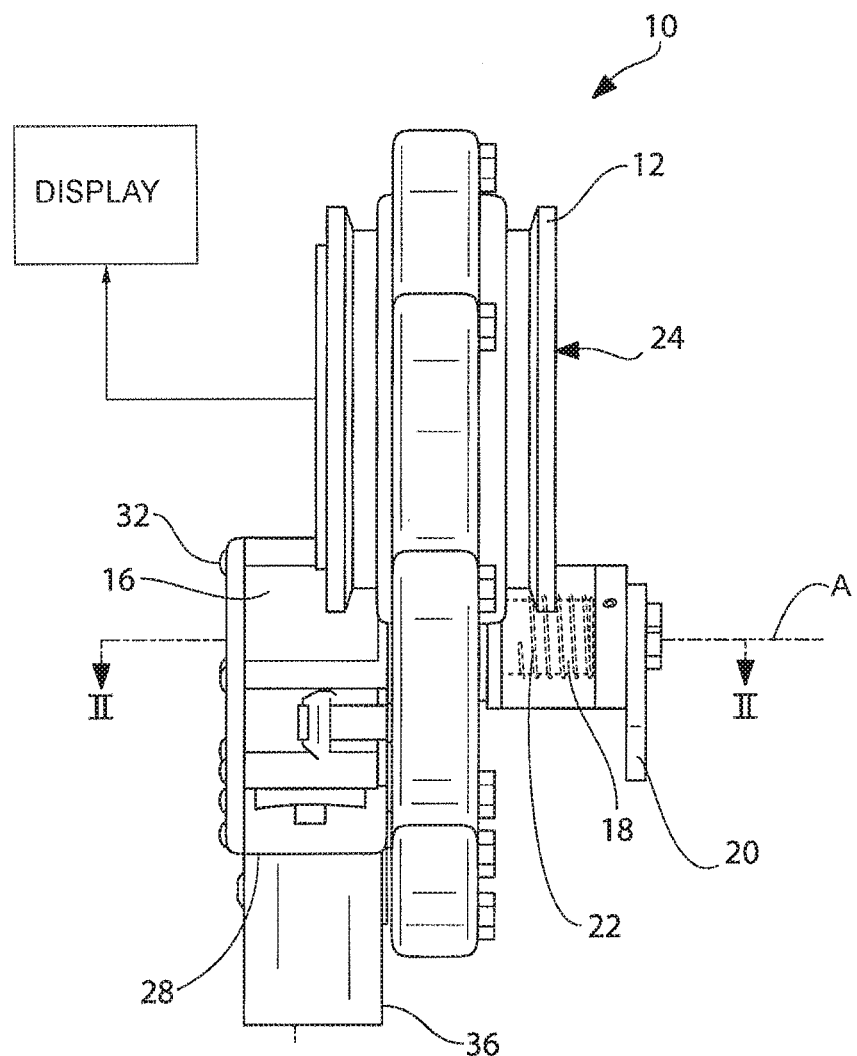
FIG. 1 is a side, elevation view of an air shutoff swing gate valve for an engine in accordance with a first preferred embodiment of the present invention.
Figure 2:
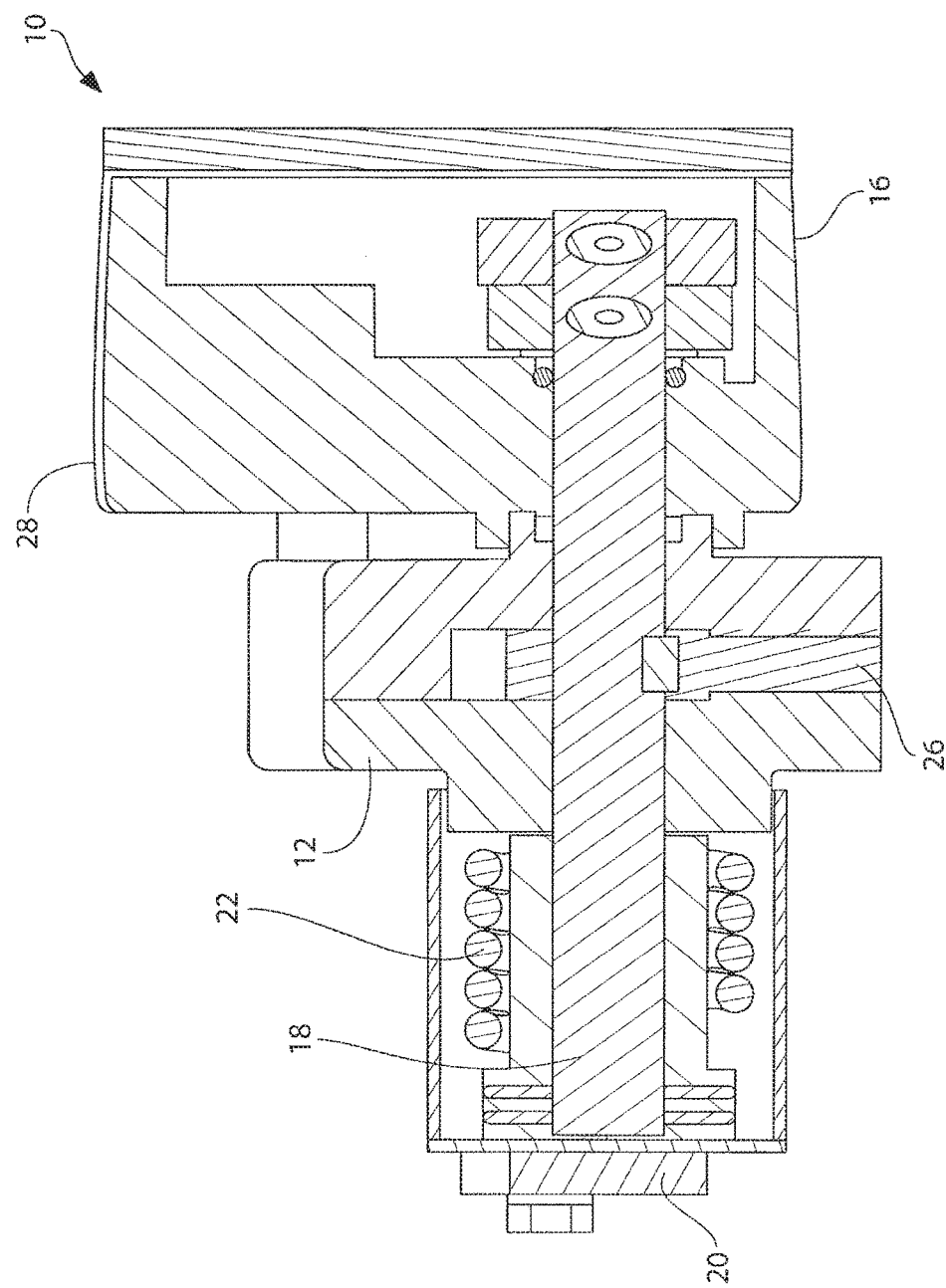
FIG. 2 is a simplified, cross-sectional view of the air shutoff swing valve of FIG. 1, taken substantially along lines II-II of FIG. 1.
Figure 3:
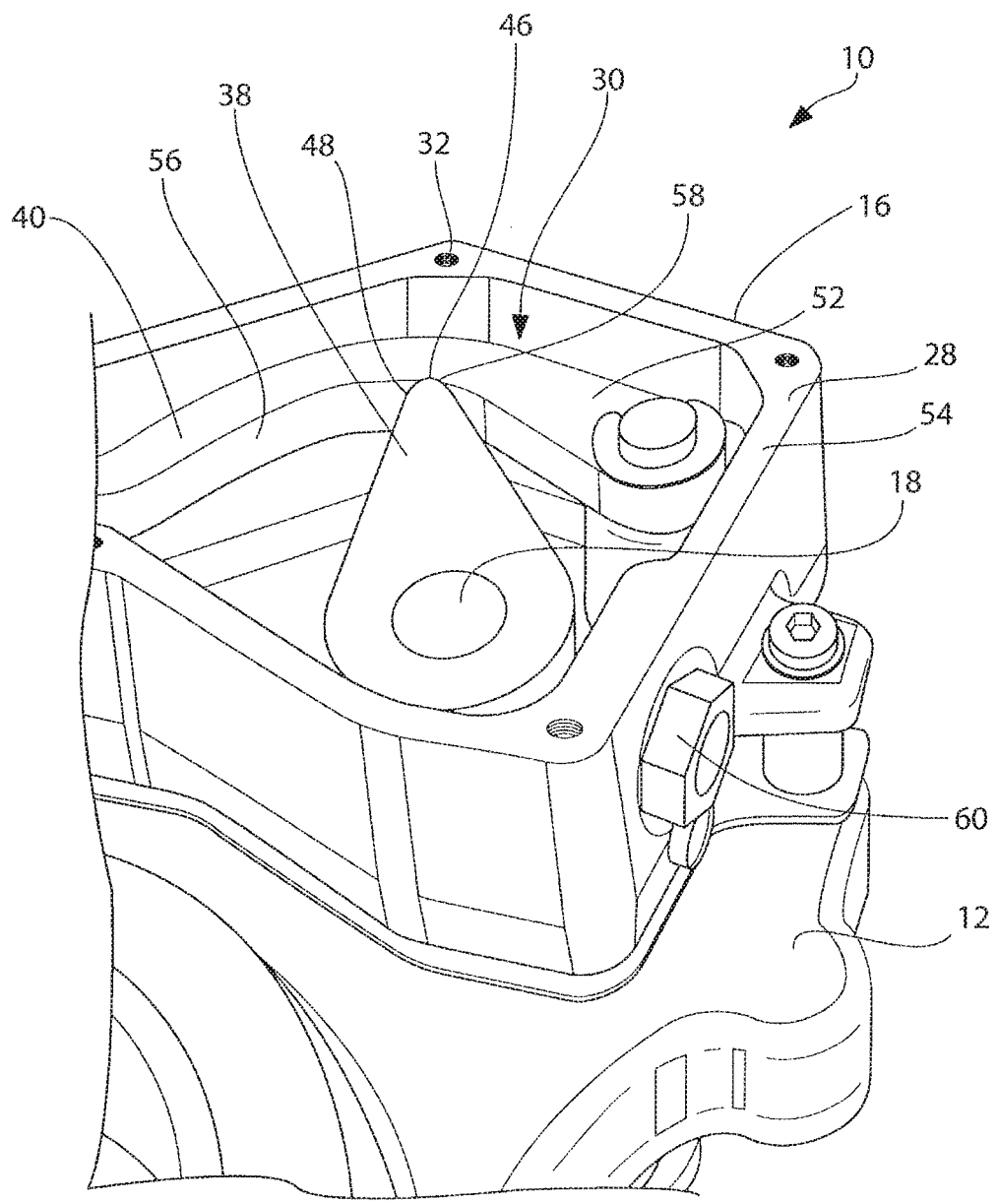
FIG. 3 is a partial, isometric view of an actuation mechanism of the air shutoff swing gate valve for an engine of FIG. 1, shown with its cover removed for clarity.
Figure 4:
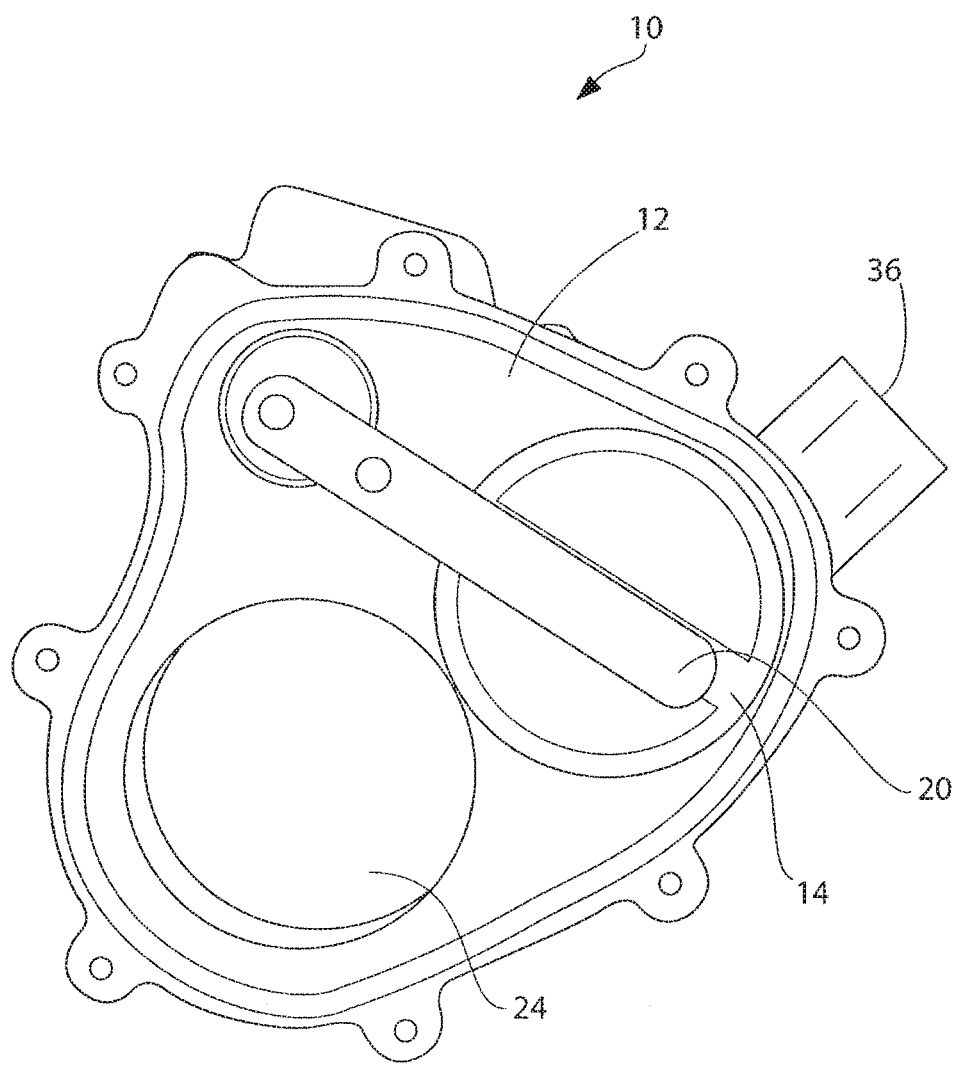
FIG. 4 is a rear, elevation view of the air shutoff swing gate valve for an engine of FIG. 1, shown with the valve in its open position.
Figure 5:
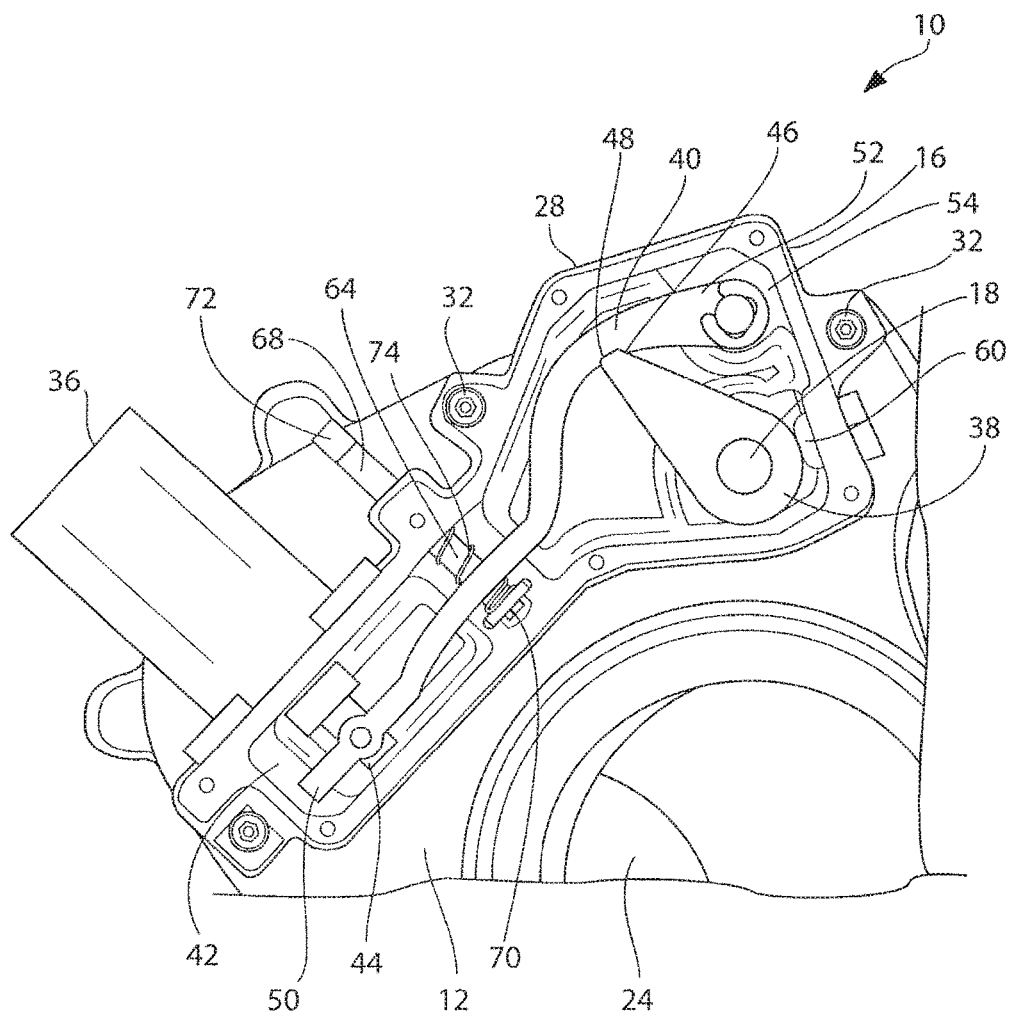
FIG. 5 is a front, elevation view of the actuation mechanism of the air shutoff swing gate valve for an engine of FIG. 1, shown with the valve in its open position, shown with its cover removed for clarity.
Figure 6:
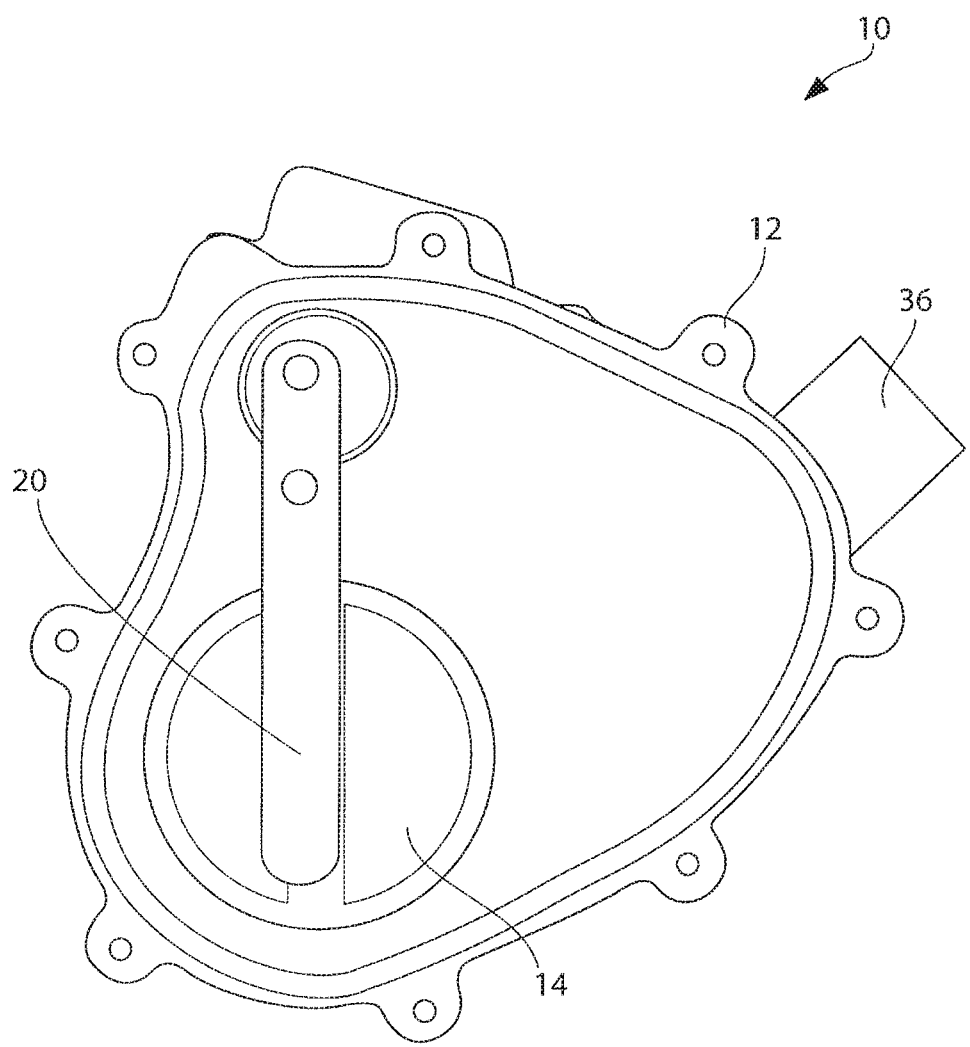
FIG. 6 is a rear, elevation view of the air shutoff swing gate valve for an engine of FIG. 1, shown with the valve in its closed position.
Figure 7:
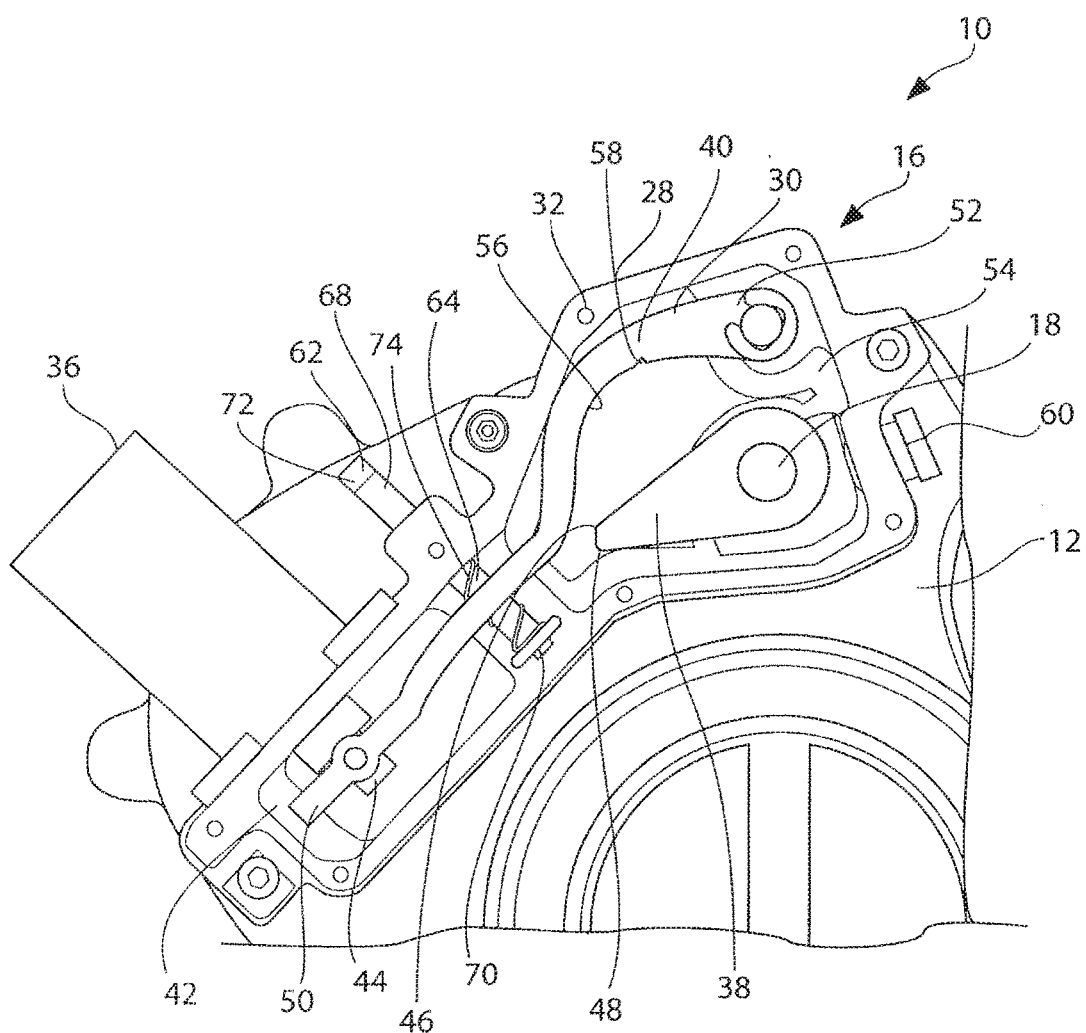
FIG. 7 is a front, elevation view of the actuation mechanism of the air shutoff swing gate valve for an engine of FIG. 1, shown with the valve in its closed position, shown with its cover removed for clarity.
Figure 8:
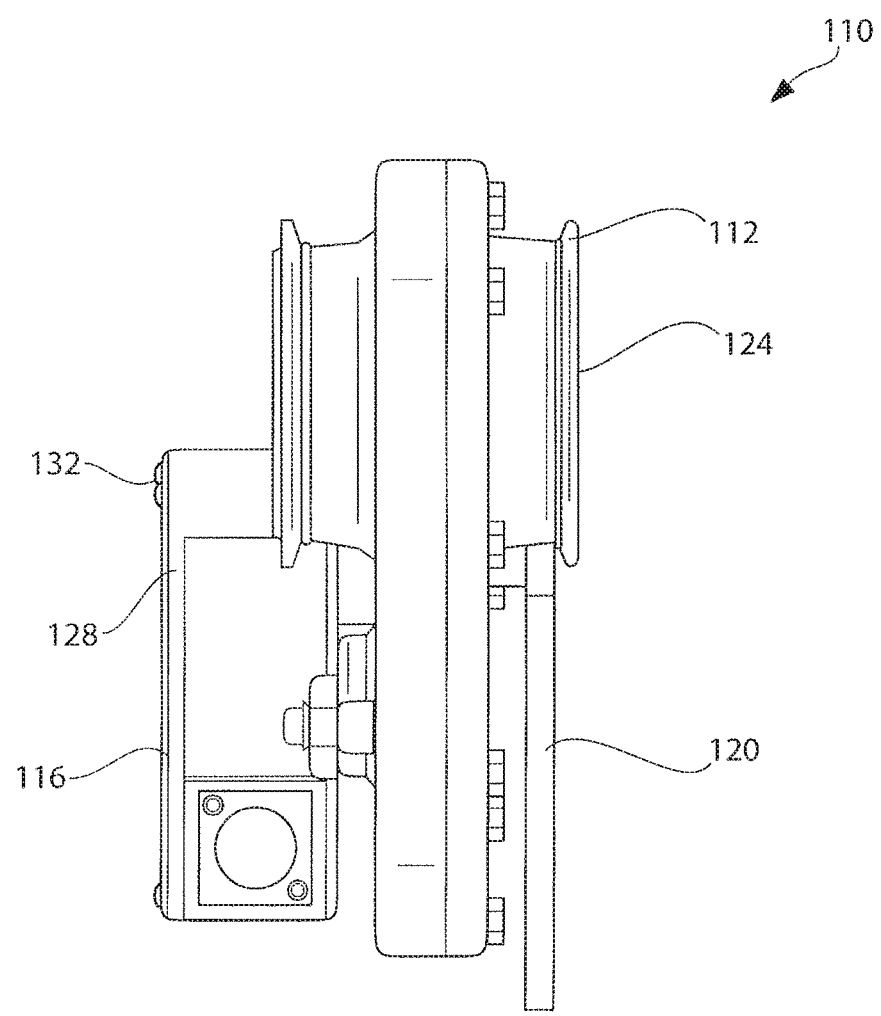
FIG. 8 is a side, elevation view of an air shutoff swing gate valve for an engine in accordance with a second preferred embodiment of the present invention.

The invention will be illustrated in more detail with reference to the following embodiments, but it should be understood that the present invention is not deemed to be limited thereto.

First and second preferred embodiments are provided. With respect to both embodiments, the present invention is directed to a swing gate valve design for use as an emergency diesel engine air shutoff swing gate valve. The embodiments are designed to operate over a wide range of on-engine intake air temperatures, ranging from about −40 degrees F. (−40 degrees C.) to about +600 degrees F. (+316 degrees C.), and elevated pressures (about 4 bar gauge) associated with, for example, post-turbocharger, pre-intercooler installation.

The valves provide a complete engine stop by providing an airtight shut-off to the intake manifold, achieved by use of a gate, which is attached to an actuating mechanism by an arm.

The swing gate valves are designed to be assembled as part of an intake manifold, for use as an emergency diesel engine air intake shutoff valve. The basic concept of the valve is that it has a manually latched gate held in the open (i.e., run) position by an actuation mechanism. The open position is defined as the gate being generally outside the intake airflow, allowing the free passage of intake air into the engine. The latched valve remains in the open position until such time as the valve is tripped, whereby the gate swings under the action of a spring into the closed position, blocking the air flow passage, and creating a generally airtight seal with the valve body. The restriction created by the closed valve fully throttles the engine, resulting in engine shutdown.

The design is similar to an existing design by AMOT/ RODA DEACO, such as Models 2190 and 2102, with enhancements for use over wider temperatures and pressures and with an improved, enclosed trigger mechanism. The trigger housing is sealed against both the environment and the charge air pressure.

The gate is preferably made from bronze. The gate is preferably loosely attached to the arm. There is substantially no possibility of fasteners working loose and entering the intake air stream of the engine. The gate is assembled to the gate arm via a pin, which is contained in place to ensure that it does not work loose.

Two seals are preferably used to prevent the charge air from leaking to the atmosphere or into the trigger housing as the shaft protrudes from the valve housing.

The actuation assembly, including the trigger assembly, is contained within a separate housing to the valve body. The trigger mechanism contains a cam and trigger arm that latch together when the gate is in the open position. The actuation assembly moving parts are connected to the gate via a linkage mechanism, which allows for manufacturing tolerances and ensures the gate is properly oriented in the open or closed position.

With respect to the first embodiment of the present valve, electric actuation is preferably used. That is, preferably, an electronic solenoid provides the actuation force. The trigger mechanism is tripped when the solenoid coil is energized and provides the actuation means to the actuator trigger mechanism. In this configuration, the valve is tripped to the closed position, when the solenoid is energized. In an alternate design the valve can trip upon loss of charge air pressure. Further, an air cylinder can be utilized as part of a pneumatic actuator to provide the tripping force. In any case, the mechanism is tripped and the spring provides the force to rotate the gate into the closed position once the cam and trigger arm are unlatched. The trigger mechanism also preferably incorporates a manual override button to manually trip the valve. The manual override button is present regardless of actuation type.

With respect to the second embodiment of the present valve, a pneumatic actuator is preferably used which is an air cylinder and piston assembly. This actuator provides the actuation means to the actuator trigger mechanism. In this configuration, the valve is tripped to the closed position when the air cylinder is pressurized. In an alternate design, the valve trips upon loss of air pressure. Alternatively, an electric solenoid can be utilized to provide the tripping force. In any case, the mechanism is tripped and a spring provides the force to rotate the gate into the closed position. Once the cam and trigger arm are unlatched. The trigger mechanism also incorporates a manual override button to manually trip the valve. The manual override button is present regardless of actuation type.

Various means of installing the air shutoff swing gate valve in place are possible, such as hump hoses or flanges (bolted, Marmon claims, etc.) by machining the appropriate geometry on the end connections of the appropriate body casting.

Both embodiments of the present invention solve numerous problems, including, but not limited to, the following:
the valve is designed to operate over a wide range of on-engine intake air temperatures, ranging from −40 degrees F. (−40 degrees C.) to about +600 degrees F. (+316 degrees C.) and elevated pressures (up to 4 bar gauge) associated with, for example, post turbocharger, pre-intercooler installation;
the valve is designed to operate under the airflow rates for standard pipe sizes without any obstructions in the flow since the gate is outside the flowing air while the engine is in operation;
the trigger housing and valve body are sealed, utilizing gaskets and elastomeric seals;
the trigger mechanism requires a low actuation force to trip, thereby requiring only small pneumatic pressures, or small electric solenoid forces. This results in reduced valve weight and minimal envelope dimensions;
the use of a gate and arm that are loosely assembled together prevents the possibility of components working loose and entering the engine through the intake air stream;
use of stainless steel components allows the valve to be used in corrosive environments;
balance in system forces avoids the gate bouncing open on actuation, permitting undesired air flow to the engine;
the valve achieves a fully closed position in less than 1 second from receipt of a trip signal;
the design of the gate and shaft assembly parts to the valve body allows for no presence of vibration of the gate in the intake air stream, thereby minimizing the turbulence generation and resulting in stable engine operation; and
a vibration free reset handle and stop device allow for long lifetime, even in "hard" installations, with no hose connections.

The air shutoff swing gate valve of the present invention is designed to be assembled as part of the intake manifold of diesel engine. The basic concept of the valve is that it utilizes a manually latched gate held in the open (or run) position by an actuation trigger mechanism. The open or run position means that the swing gate allows for free passage of intake air into the engine. The latched valve remains in the open position until such time as the valve is tripped, whereby the swing gate rotates, under the action of a spring, creating an airtight seal with the valve body. The restriction created by the closed disc fully throttles the engine, resulting in an engine shut down.

Referring now to the drawing figures, wherein like part numbers refer to like elements throughout the several views, there is shown in FIGS. 1-7 an air shutoff swing gate valve 10 for an engine in accordance with a first preferred embodiment of the present invention. The air shutoff swing gate valve 10 generally includes a valve body 12, a valve swing gate 14, an actuation assembly 16, a pivotable shaft 18, a reset handle 20, and a spring 22 (for example, a torsion spring, as shown).

The valve body 12 has an air passage 24 therein for supplying air to an engine to which the air shutoff valve 10 is attached. The swing gate 14 is pivotable on a swing arm 26 that is pivotally disposed. The swing gate 14 is pivotable from an open position (see FIG. 4) wherein the swing gate 14 is positioned adjacent to the air passage 24 to provide for free flow of air through the air passage 24, to a closed position (see FIG. 6) wherein the swing gate 14 is positioned within the air passage 24 to substantially close off the air passage 24. The actuation assembly 16 includes an actuation housing 28 and a trigger assembly 30. The actuation housing 28 is preferably disposed on the valve body 12 by fasteners 32 (e.g. the threaded holes shown in combination with screws).

The pivotable shaft 18 has a longitudinal axis A (see FIG. 1) and extends from the actuation assembly 16 at least to the swing arm 26. The swing arm 26 is disposed on the shaft 18 such that rotation of the shaft 18 about its longitudinal axis A causes rotation of the swing arm 26 to move the swing gate 14 between its open (see FIG. 4) and closed positions (see FIG. 6). The reset handle 20 is disposed on the shaft 18 such that rotation of the reset handle 20 to rotate the shaft 18 causes the swing gate 14 to move from its closed position to its open position. The spring 22 rotationally biases the shaft 18 about its longitudinal axis A to urge the swing gate 14 toward its closed position.

The trigger assembly 30 is for securing shaft 18 such that the swing gate 14 is held in its open position (see FIG. 4) and for triggering the shaft 18 to rotate due to biasing from the spring 22 to cause the swing gate 14 to move from the open position to the closed position. The trigger assembly 30 generally includes an actuator 36 (preferably linear), a pivotable cam 38, and a trigger rocker arm 40 (see FIGS. 3, 5 and 7). The actuator 36 is disposed at a first end 42 of the actuation housing 28 and has an actuator shaft 44. The pivotable cam 38 is disposed in the actuation housing 28 and is disposed on the pivotable shaft 18 such that rotation of the shaft 18 causes rotation of the pivotable cam 38. The pivotable cam 38 also has a sear point 46 and a cam contact surface 48. The trigger rocker arm 40 is disposed in the actuation housing 28 and has a first end 50 pivotally attached to actuator shaft 44 of the actuator 36, a second end 52 pivotally attached to a second end 54 of the actuation housing 28, and a curved cam surface 56 adjacent to the second end 52 of the trigger rocker arm 40. The curved cam surface 56 has a notch 58 (best seen in FIG. 7) to receive the sear point 46 of the cam 38. The cam surface 56 of the trigger rocker arm 40 is for contacting the cam contact surface 48 of the cam 38 such that rotational movement of the reset handle 20 against the bias of the spring 22 causes the cam contact surface 48 of the pivotable cam 38 to follow the cam surface 56 of the trigger rocker arm 40 to cause the rocker arm 40 to rotate about its second end 52 to a position when the sear point 46 is received in the notch 58. See FIGS. 1, 2, 4 and 6.

Actuation of the actuator 36 to cause (preferably, but not limited to, linear) movement of the actuator shaft 44 causes the first end 50 of the rocker arm 40 to move such that the rocker arm 40 pivots about the second end 52 of the rocker arm 40 away from the cam 38 such that the sear point 46 of the cam 38 is released from notch 58 of the rocker arm 40, thereby allowing the spring 22 to cause the pivotable shaft 18 to rotate about its longitudinal axis to move the swing gate to its closed position.

The actuator 36 may be of substantially any type. It is preferably a linear actuator, but any actuator or solenoid or similar device that provides an appropriate movement of the rocker arm 40 is considered to be within the scope of the present invention. For example, mechanical, electro-mechanical, solenoid, hydraulic, pneumatic, and piezo actuators could all work appropriately.

A switch 60 may be provided that is connected to a display to indicate when the swing gate 14 is in its open and closed positions. The switch 60 may be, for example, adjacent to the cam 38 wherein rotation of the cam 38 activates and deactivates the switch 60. The switch 60 may be, for example, an electro-magnetic switch, a mechanical switch or Hall-effect switch.

A manual override device 62 may be provided to trip the trigger assembly 30 to manually cause the swing gate 14 to move to the closed position to block air to the engine. The manual override device 62 includes an override device shaft 64 slidably disposed in an aperture in the actuator housing 28 adjacent to the actuator 36. The override device shaft 64 is substantially parallel to an axis of movement of the actuator shaft 44. The override device shaft 64 has a first end 68 and a second end 70. The first end 68 is disposed outside the actuator housing 28 and has a handle 72 for manual movement of the override device shaft 64 through the aperture. The second end 70 is disposed adjacent to the first end 50 of the rocker arm 40 such that manual movement of the override device shaft 64 causes substantially identical movement of the rocker arm 40 as the movement caused by the actuator shaft 44. The manual override device 62 may be biased by a spring 74 to a position where it does not contact the rocker arm 40.

There is shown in FIGS. 8-13 an air shutoff swing gate valve 110 for an engine in accordance with a second preferred embodiment of the present invention. The air shutoff swing gate valve 110 generally includes a valve body 112, a valve swing gate 114, an actuation assembly 116, a pivotable shaft 118, a reset handle 120, and a spring 122.

The valve body 112 has an air passage 124 therein for supplying air to an engine to which the air shutoff valve 110 is attached. The swing gate 114 is pivotable on a swing arm 126 that is pivotally disposed adjacent to the valve body 112. The swing gate 14 is pivotable from an open position (see FIG. 10) wherein the swing gate 114 is positioned adjacent to the air passage 124 to provide for free flow of air through the air passage 124, to a closed position (see FIG. 9) wherein the swing gate 114 is positioned within the air passage 124 to substantially close off the air passage 124. The actuation assembly 116 includes an actuation housing 128 and a trigger assembly 130. The actuation housing 128 is preferably disposed on the valve body 112 by fasteners 132.

A pivotable shaft 118 has a longitudinal axis B (see FIG. 11) and extends from the actuation assembly 116 at least to the swing arm 126. The swing arm 126 is disposed on the shaft 118 such that rotation of the shaft 118 about its longitudinal axis B causes rotation of the swing arm 126 to move the swing gate 114 between its open (see FIG. 10) and closed positions (see FIG. 9). The reset handle 120 is disposed on the shaft 118 such that rotation of the reset handle 120 to rotate the shaft 118 causes the swing gate 114 to move from its closed position to its open position. The spring 122 rotationally biases the shaft 118 about its longitudinal axis B to urge the swing gate 114 toward its closed position (see FIG. 9).

Figure 9:
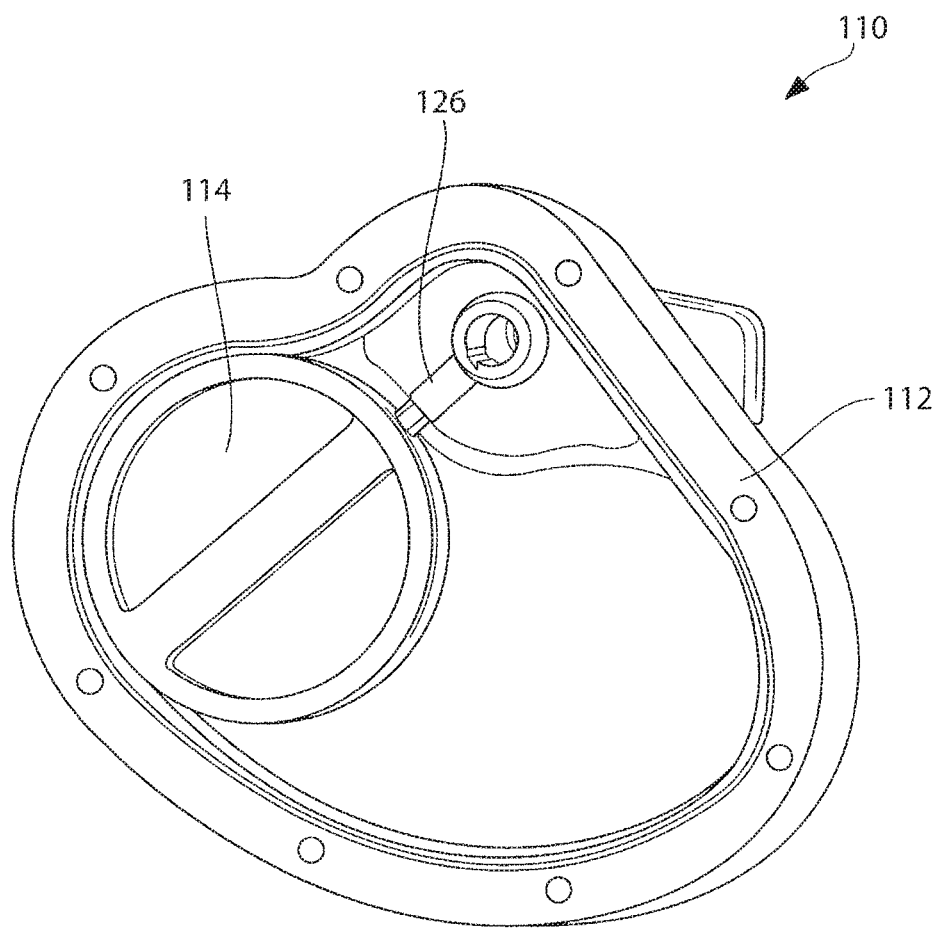
FIG. 9 is a rear, isometric view of the air shutoff swing gate valve for an engine of FIG. 8, shown with the valve in its closed position.
Figure 10:
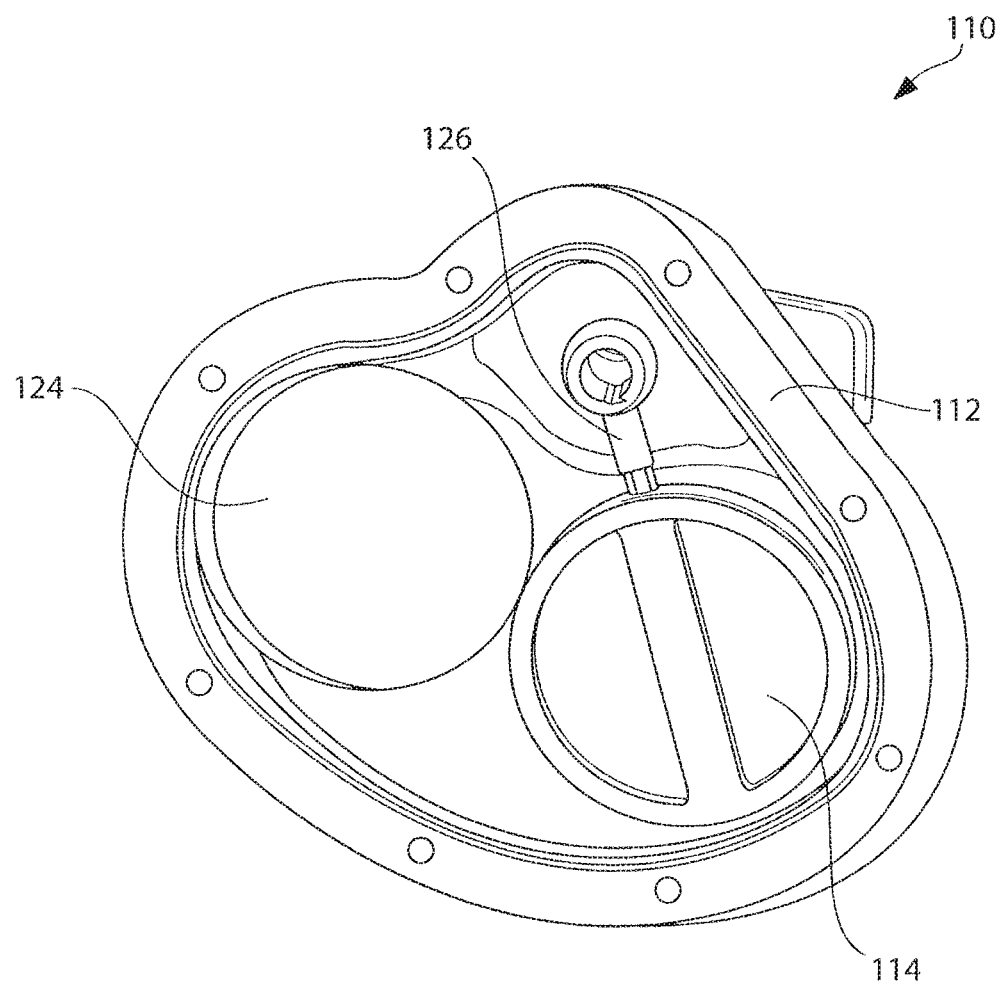
FIG. 10 is a rear, isometric view of the air shutoff swing gate valve for an engine of FIG. 8, shown with the valve in its open position.
Figure 11:
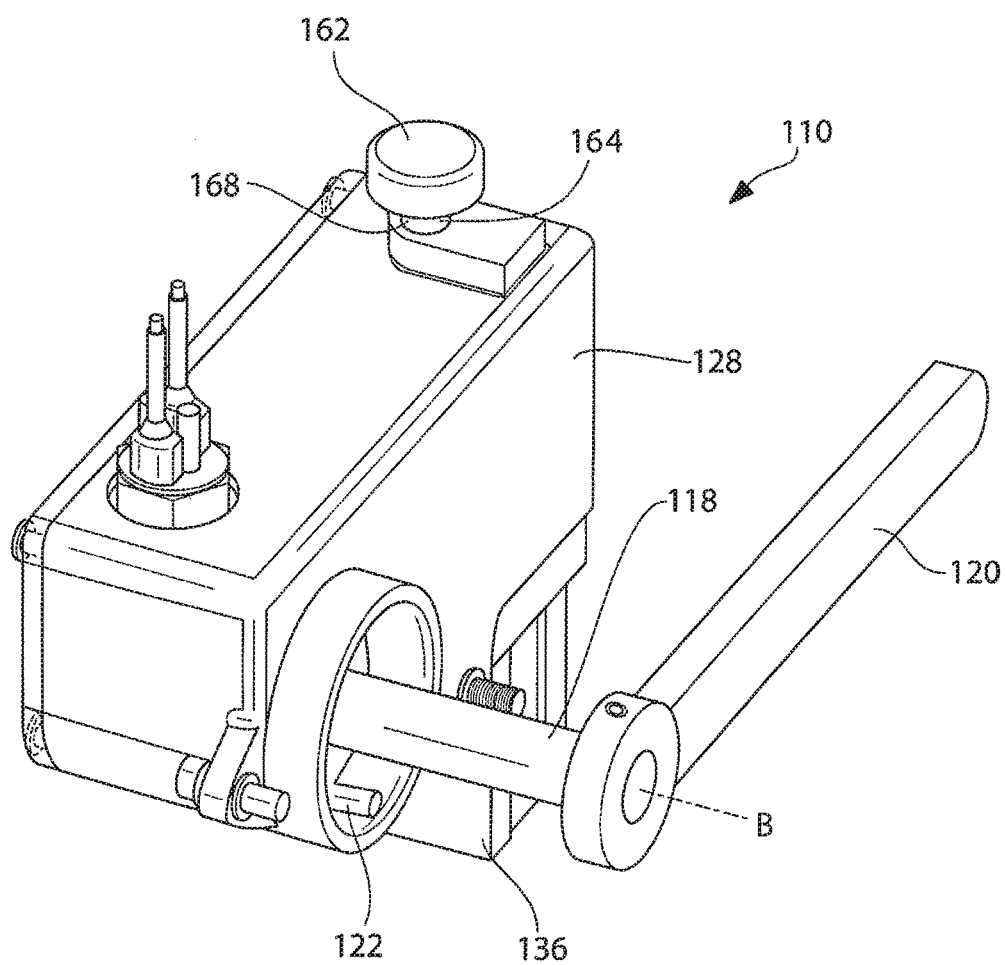
FIG. 11 is an isometric view of an actuation mechanism of the air shutoff swing gate valve of FIG. 8.
Figure 12:
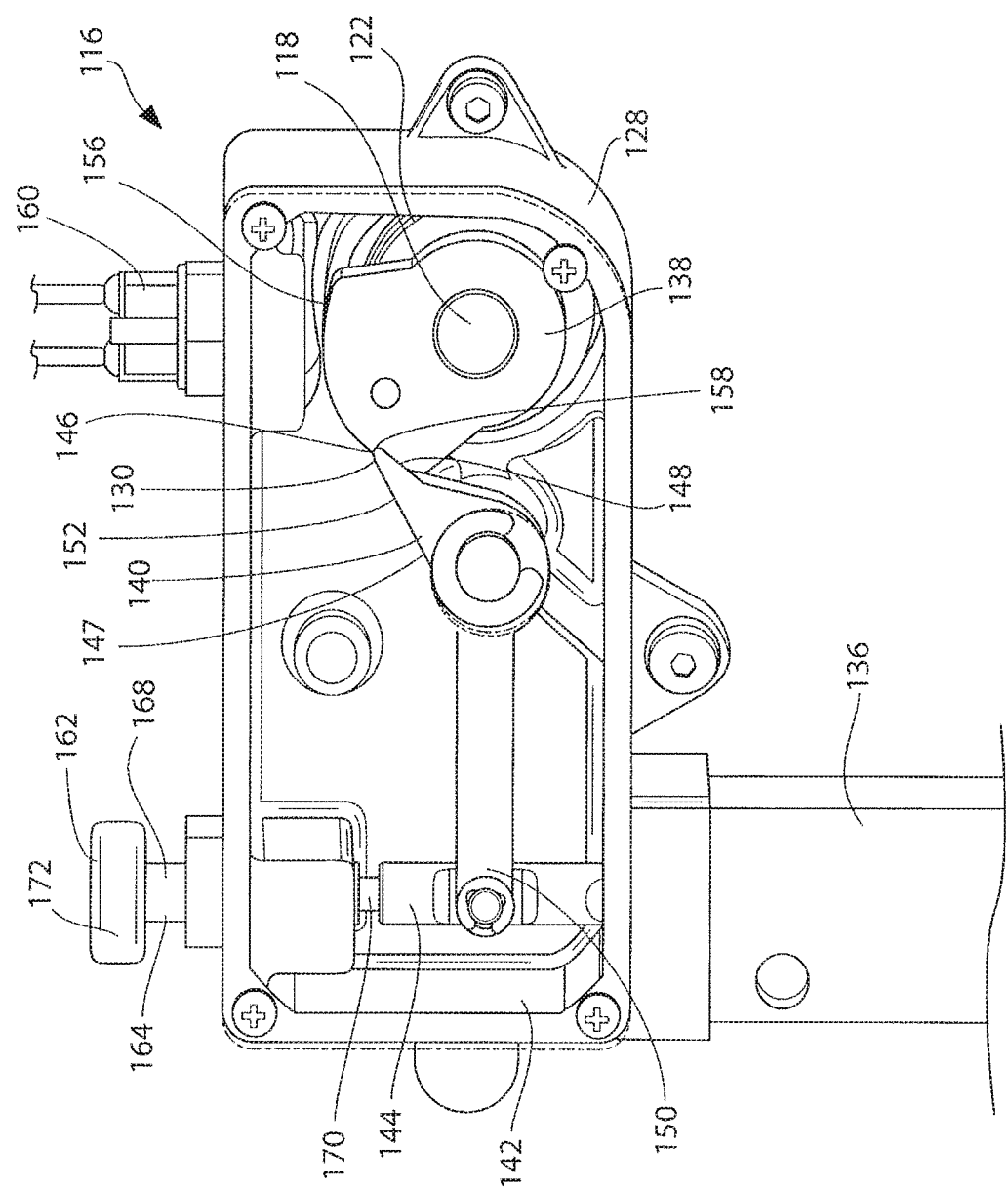
FIG. 12 is a front isometric view of the actuation mechanism of FIG. 11, shown set for the valve to be in an open position, shown with its cover removed for clarity.
Figure 13:
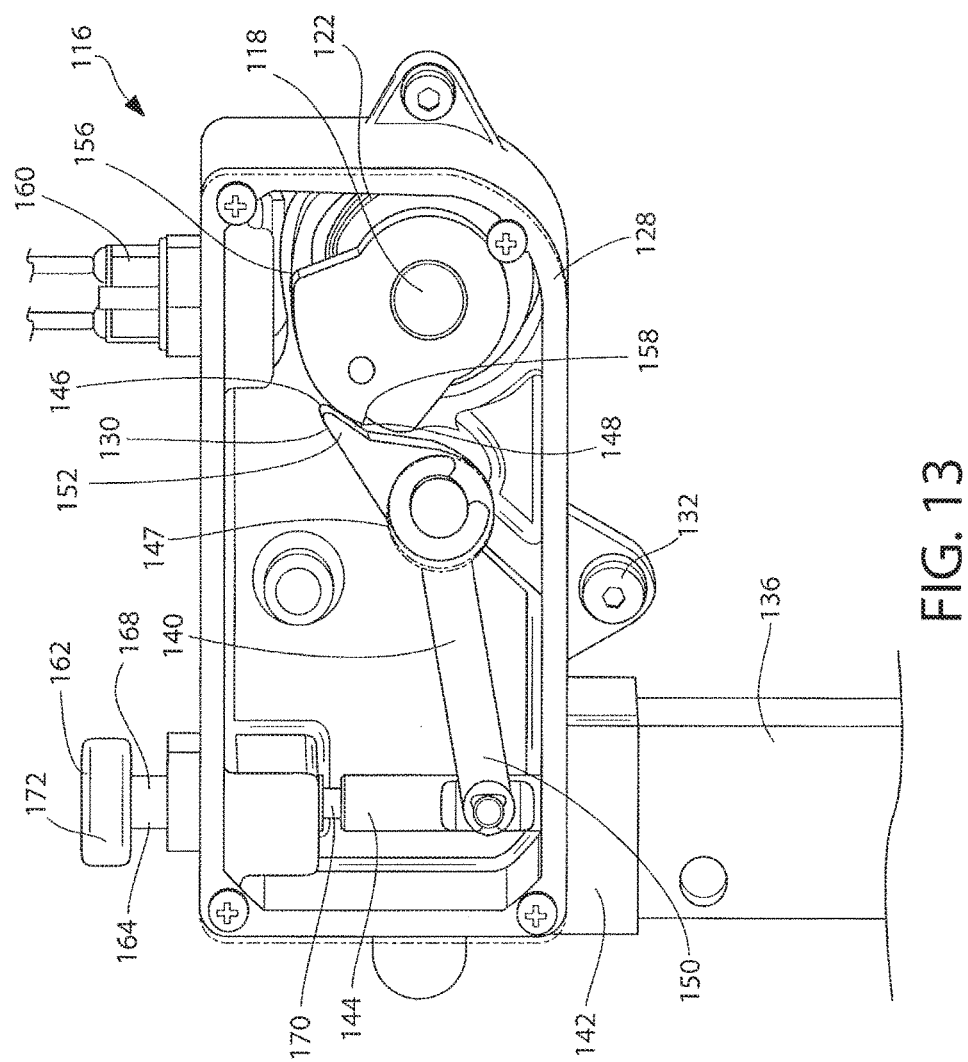
FIG. 13 is a front isometric view of the actuation mechanism of FIG. 11, shown set for the valve to be in a closed position, shown with its cover removed for clarity.

The trigger assembly 130 is for securing shaft 118 such that the swing gate 114 is held in its open position (see FIG. 10) and for triggering the shaft 118 to rotate due to biasing from the spring 122 to cause the swing gate 114 to move from the open position to the closed position (see FIG. 9). As can best be seen in FIGS. 12 and 13, the trigger assembly 130 generally includes an actuator 136 (preferably linear), a pivotable cam 138, and a trigger rocker arm 140. The actuator 136 is disposed at a first end 142 of the actuation housing 128 and has an actuator shaft 144. The pivotable cam 138 is disposed in the actuation housing 128 and is disposed on the pivotable shaft 118 such that rotation of the pivotable shaft 118 causes rotation of the pivotable cam 138. The pivotable cam 138 also has a notch 158 and a cam surface 156. The trigger rocker arm 140 is disposed in the actuation housing 128 and has a first end 150 pivotally attached to actuator shaft 144 of the actuator 136. The trigger rocker arm 140 also has a central portion 147 pivotally attached to the actuation housing 128 between the pivotable cam 138 and the actuator 136. Finally, the trigger rocker arm has the sear point 146 and the cam contact surface 148 at its second end 152. The sear point 146 is for receipt in the notch 158 of the cam 138. The cam surface 156 of the pivotable cam 138 is for contacting the cam contact surface 148 of the trigger rocker arm 140 such that manual rotational movement of the reset handle 120 against the bias of the spring 122 causes the cam contact surface 148 of the trigger rocker arm 140 to follow the cam surface 156 of the pivotable cam 138 to cause the rocker arm 140 to rotate about its central portion 147 to a position until the sear point 146 is received and held in the notch 158.

Actuation of the actuator 136 to cause linear movement of the actuator shaft 144 causes the first end 150 of the rocker arm 140 to move such that the rocker arm 140 pivots about the central portion 147 of the rocker arm 140 to cause the second end 152 of the rocker arm 140 to rotate away from the notch 158 such that the sear point 146 of the trigger rocker arm 140 is released from notch 158 of the cam 138, wherein the spring 122 causes the shaft 118 to rotate about its longitudinal axis B to move the swing gate 114 to its closed position.

Again, the actuator 136 may be of substantially any type. It is preferably a linear actuator, but any actuator or solenoid or similar device that provides an appropriate movement of the rocker arm 140 is considered to be within the scope of the present invention. For example, mechanical, electromechanical, hydraulic, pneumatic, and piezo actuators could all work appropriately.

A switch 160 may be provided that is connected to a display to indicate when the swing gate 114 is in its open and closed positions. The switch 160 may be adjacent to the cam 138 wherein rotation of the cam 138 activates and deactivates the switch 160. The switch 160 may be, for example, an electromagnetic switch, a mechanical switch, or Hall-effect switch.

A manual override device 162 may be provided to trip the trigger assembly 130 to provide for manual tripping of the swing gate 114 to move it to the closed position to block air to the engine. The manual override device 162 includes an override device shaft 164 slidably disposed in an aperture in the actuation housing 128 adjacent to the actuator 136. The override device shaft 164 is coaxial with the actuator shaft 144. The override device shaft 164 has a first end 168 and a second end 170. The first end 168 is disposed outside the actuator housing 128 and has a handle 172 (or button or any portion available to manually grip) for manual movement of the override device shaft 164 through the aperture. The second end 170 is disposed on the actuator shaft 144 such that manual movement of the override device shaft 164 causes substantially identical movement of the rocker arm 140 as the movement caused by the actuator shaft 144.

With respect to both embodiments, preferably, the valve body 12, 112 is aluminum, but any suitable material may be used. Preferably, Marmon flanges may be used to connect the valve 10 to the engine, however, any suitable flange may be used. Preferably, the gate is manufactured from bronze alloy.

The present invention operates in either "hard installations," such as integral with aluminum piping, or "soft installations," such as along rubber hoses. Each of the improvements described herein helps the valve to operate in high vibration and temperature environments.

While the present invention has been described primarily with respect to an engine, such as a diesel engine, the present invention is not intended to be limited only to engines. It is intended to apply to substantially any application where a cutoff valve could be used, even including, for example, a water cutoff supply.

While the invention has been described in detail and with reference to specific embodiments thereof, it will be apparent to one skilled in the art that various changes and modifications can be made therein without departing from the spirit and scope thereof.

What is claimed is:

1. An air shutoff swing gate valve, comprising:
   a valve body having an air passage therein for conveying an air flow therethrough;
   a valve swing gate, pivotable on a swing arm that is pivotally disposed adjacent to the valve body, the swing gate pivotable from an open position wherein the swing gate is positioned adjacent to the air passage to provide for free flow of air through the air passage, to a closed position wherein the swing gate is positioned within the air passage to substantially close off the air passage;
   a pivotable shaft having a longitudinal axis, the shaft extending generally perpendicular to the swing arm, the swing arm disposed on the shaft such that rotation of the shaft about the longitudinal axis causes rotation of the swing arm, to move the swing gate between the open and closed positions; and
   an actuation housing for controlling said shaft rotation, said actuation housing being separate from said valve body and sealed against the environment and thermally-isolated from said valve body, said actuation housing comprising:
      a trigger assembly for securing the swing gate in the open position and for triggering said pivotable shaft to rotate due to biasing from a spring, which biases said shaft towards said closed position, to cause the swing gate to move from the open position to the closed position,
   wherein said trigger assembly comprises:
      an actuator having a displaceable actuator shaft,
      a pivotable cam that is coupled to one end of the pivotable shaft such that rotation of the pivotable shaft causes rotation of the pivotable cam, and
      a rocker arm having a first end pivotably coupled to the displaceable actuator shaft, a second end pivotably coupled within the actuation housing, and a curved surface located between the first and second ends and adjacent the second end,
   wherein the pivotable cam is configured to contact the curved surface of the rocker arm when the pivotable cam rotates.

2. The air shutoff swing gate of claim 1, wherein said actuation housing is thermally-isolated from said valve body to protect said trigger assembly from temperature extremes of the air flow in said valve body and from the environment.

3. The air shutoff swing gate valve of claim 1, wherein the curved surface of the rocker arm comprises a notch to receive a sear point of said pivotable cam to lock the swing gate in the open position.

4. The air shutoff swing gate valve of claim 3 wherein said valve further comprises a reset handle coupled to said pivotable shaft, said reset handle being movable to cause said sear point to move along said rocker arm to move said sear point into said notch.

5. The air shutoff swing gate valve of claim 1, wherein the actuator is mechanical, electro-mechanical, hydraulic, pneumatic, or piezo.

6. The air shutoff swing gate valve of claim 5 wherein the actuator is an electric solenoid.

7. The air shutoff swing gate valve of claim 6 wherein said displaceable actuator shaft coupled to said rocker arm provides latching leverage and de-latching leverage for controlling said gate positions.

8. The air shutoff swing gate valve of claim 6 wherein said displaceable actuator shaft displaces said first end of the rocker arm linearly.

9. The air shutoff swing gate valve of claim 1 wherein said actuator, pivotable cam and rocker arm are configured to:
maintain a first position of said rocker arm to achieve said open position of said swing gate against said spring bias; and
establish, in response to an actuation force applied to the displaceable actuator shaft, a second position of said rocker arm for relieving said spring bias to achieve said closed position of said swing gate.

10. The air shutoff swing gate of claim 9 wherein said actuation housing is thermally-isolated from said valve body to protect said trigger assembly from temperature extremes of the air flow in said valve body and from the environment.

11. The air shutoff swing gate valve of claim 9 wherein the curved surface of said rocker arm comprises a sear point that is received in a notch of said pivotable cam to lock the swing gate in the open position.

12. The air shutoff swing gate valve of claim 11 wherein said valve further comprises a reset handle coupled to said pivotable shaft, said reset handle being movable to cause said sear point to move along said pivotable cam to move said sear point into said notch.

13. The air shutoff swing gate valve of claim 9 wherein the actuator is mechanical, electro-mechanical, hydraulic, pneumatic, or piezo.

14. The air shutoff swing gate valve of claim 13 wherein the actuator is an electric solenoid.

15. The air shutoff swing gate valve of claim 14 wherein said displaceable actuator shaft coupled to said rocker arm provides latching leverage and de-latching leverage for controlling said gate positions.

16. The air shutoff swing gate valve of claim 14 wherein said displaceable actuator shaft displaces said first end of the rocker arm linearly.

17. The air shutoff swing gate valve of claim 9 wherein said spring comprises a torsion spring concentrically aligned with said longitudinal axis.

18. The air shutoff swing gate valve of claim 1 wherein said spring comprises a torsion spring concentrically aligned with said longitudinal axis.

19. A method for automatically controlling an air shutoff swing gate valve, said method comprising:
providing a valve body having an air passage therein for conveying an air flow therethrough;
pivotally coupling a swing arm at one end adjacent said valve body while forming a valve gate at a second end of said swing arm to form a valve swing gate, said valve swing gate being pivotable from an open position wherein said valve swing gate is positioned adjacent to the air passage to provide for free flow of air flow through the air passage, to a closed position wherein said valve swing gate is positioned within the air passage to substantially close off the air passage;
coupling a pivotable shaft, having a longitudinal axis, to said swing arm in a generally perpendicular orientation and wherein rotation of said shaft about the longitudinal axis causes rotation of said swing arm to move said swing gate between the open and closed positions; and
forming an actuation housing, for controlling said shaft rotation, and
positioning a trigger assembly within said actuation housing, said trigger assembly securing said valve swing gate in the open position and for triggering said shaft to rotate due to biasing from a spring to cause said valve swing gate to move from said open position to said closed position,
wherein positioning the trigger assembly comprises:
providing an actuator having a displaceable actuator shaft,
coupling one end of said pivotable shaft to a pivotable cam such that rotation of said pivotable shaft causes rotation of the pivotable cam, and
pivotably coupling a first end of a rocker arm to the displaceable actuator shaft and pivotally coupling a second end of said rocker arm within the actuation housing, wherein the rocker arm includes a curved surface located between the first and second ends of the rocker arm and adjacent the second end of the rocker arm, and
wherein the pivotable cam is configured to contact the curved surface of the rocker arm when the pivotable cam rotates.

20. The method of claim 19 wherein said step of forming an actuation housing comprises thermally-isolating said actuation housing from said valve body for protecting said trigger assembly from temperature extremes of the air flow in the valve body and from the environment.

21. The method of claim 19 wherein said step of pivotally coupling a first end of a rocker arm comprises providing a notch within the curved surface of said rocker arm to receive a sear point of said pivotable cam to lock the valve swing gate in the open position.

22. The method of claim 21 further comprising the step of coupling a reset handle to said pivotable shaft, said reset handle being movable to cause said sear point to move along said rocker arm to restore said sear point into said notch.

23. The method of claim 19 wherein said step of providing an actuator comprises providing a mechanical, electro-mechanical, hydraulic, pneumatic, or piezo acuator.

24. The method of claim 19 wherein said step of providing an actuator comprises providing an electric solenoid.

25. The method of claim 24 wherein said displaceable actuator shaft coupled to said rocker arm provides latching leverage and de-latching leverage for controlling said gate positions.

26. The method of claim 24 wherein said step of providing an actuator having a displaceable actuator shaft comprises displacing said first end of the rocker arm linearly.

27. The method of claim 19 wherein said step of positioning a trigger assembly comprises installing a torsion spring to be concentrically aligned with said longitudinal axis.

28. The method of claim 19,
wherein said actuator, pivotable cam and rocker arm are configured to:
maintain a first position of said rocker arm to achieve said open position of said valve swing gate; and
establish, in response to an actuator force applied to the displaceable actuator shaft, a second position of said rocker arm for relieving said spring bias to achieve said closed position of said valve swing gate.

29. The method of claim 28 wherein said step of forming an actuation housing comprises protecting said trigger assembly from temperature extremes in the air flow in the valve body and from the environment.

30. The method of claim 28 wherein said step of pivotally coupling a first end of a rocker arm comprises providing a notch within the curved surface of said rocker arm to receive a sear point of said pivotable cam to lock the valve swing gate in the open position.

31. The method of claim 30 further comprising the step of coupling a reset handle to said pivotable shaft, said reset handle being movable to cause said sear point to move along said rocker arm to restore said sear point into said notch.

32. The method of claim 28 wherein said step of providing an actuator comprises providing a mechanical, electro-mechanical, hydraulic, pneumatic, or piezo actuator.

33. The method of claim 32 wherein said step of providing an actuator comprises providing an electric solenoid.

34. The method of claim 33 wherein said displaceable actuator shaft coupled to said rocker arm provides latching leverage and de-latching leverage for controlling said gate positions.

35. The method of claim 33 wherein said step of providing an actuator having a displaceable actuator shaft comprises displacing said first end of the rocker arm linearly.

* * * * *